Feb. 28, 1950

C. H. HENDERSON 2,498,955

ELECTRICALLY HEATED GLUE POT

Filed May 6, 1946

INVENTOR.
Clyde H. Henderson
BY Alfred R. Fuchs
ATTORNEY.

Patented Feb. 28, 1950

2,498,955

UNITED STATES PATENT OFFICE 2,498,955

ELECTRICALLY HEATED GLUEPOT

Clyde H. Henderson, Kansas City, Mo.

Application May 6, 1946, Serial No. 667,649

7 Claims. (Cl. 219—44)

My invention relates to glue pots, and more particularly to electrically heated glue pots.

It is a purpose of my invention to provide a glue pot which will evenly heat the glue in the pot to the proper temperature to keep the glue in the right condition for use, but which will not excessively heat the glue so as to damage the adhesive properties thereof or to cause the same to burn onto the pot.

It is a further purpose of my invention to provide a glue pot of the above mentioned character, which is water jacketed and which is so constructed and arranged that the water in the jacket will not escape therefrom, thus eliminating the possibility of the water jacket going dry if reasonable care is used in the operation of the device.

It is another purpose of my invention to provide a glue pot of the above mentioned character, which can be easily kept clean from any glue running down the sides thereof or otherwise becoming attached to portions of the water jacket, and to provide a cover for the glue pot so as to aid in maintaining the glue in the pot in proper condition for use when no glue is being removed therefrom.

It is a further purpose of my invention to provide a glue pot of the above mentioned character with means for mounting an electrical heating unit on the under side of the bottom of the water receptacle, and to provide a glue container and a water receptacle that have the walls so shaped as to direct the convection currents of the heated water into engagement with all of the wall portions of the glue container to evenly heat the glue throughout the said glue container.

It is a particular purpose of my invention to provide a glue pot of the above mentioned character comprising a water receptacle that has a side wall that has an inwardly directed flange terminating in a depending annular rib spaced from the side wall providing a drip flange which will return any water that is condensed in the upper portion of the water receptacle to the body of water therein, and to provide a flat finished top surface thereon and a finished cylindrical inner face thereon, with which a flat under face on an outwardly directed flange on the glue pot and a cylindrical wall portion adjacent said flange on said glue pot engage in closely fitting relation, to provide a liquid tight joint between the glue pot and the receptacle.

It is a further purpose of my invention to provide a glue pot of the above mentioned character with means whereby a lid can be readily placed in position in close fitting relationship to the body portion of the glue pot and which glue pot is provided with a peripheral outwardly directed flange at the upper end of the body portion thereof, which is so constructed and arranged as to prevent any glue that might otherwise run down the outer side of the glue pot and the water receptacle from doing so, having means for directing said glue back into the pot.

Other objects and advantages of my invention will appear as the description of the drawings proceeds. I desire to have it understood, however, that I do not intend to limit myself to the particular details shown or described, except as defined in the claims.

Figure 1:
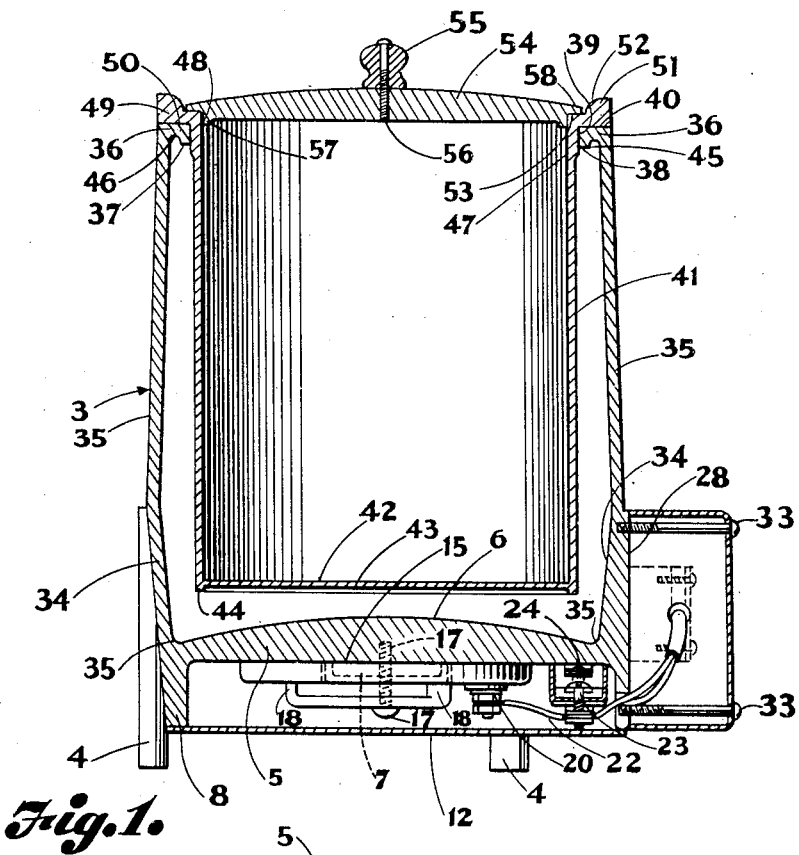
Fig. 1 is a vertical sectional view through my improved glue pot.
Figure 2:
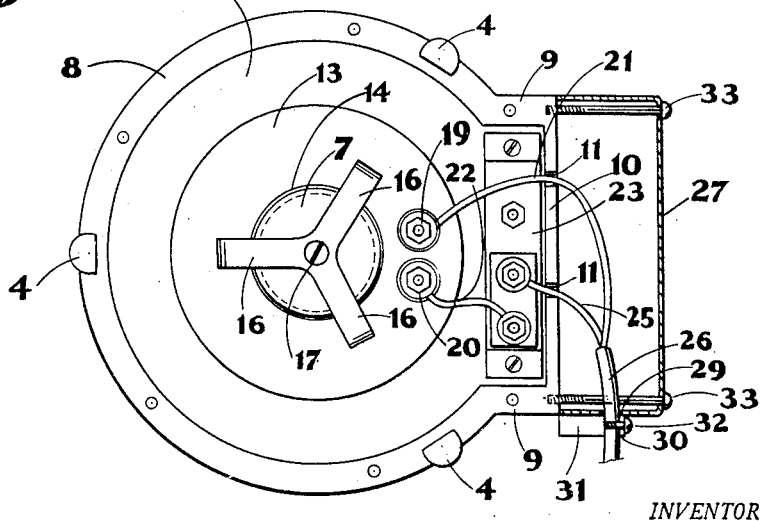
Fig. 2 is a bottom plan view thereof.

Referring in detail to the drawings, my improved glue pot comprises an outer water receptacle 3, which is provided with a plurality of legs 4 for mounting the same on a support, and which has a bottom wall 5 having a convex upper surface 6, the highest point thereof being in the axial center of said bottom wall, said bottom wall also having a circular lug 7 depending from the bottom face thereof and having a peripheral flange 8 thereon concentric with said lug, said flange having lateral extensions 9 and a transverse connecting portion 10 provided with a plurality of grooves 11 therein.

A plate 12 is secured in any suitable manner to the peripheral flange 7 so as to provide a housing within said flange. An annual flat faced heating element 13 having a central opening 14 is mounted on the flat bottom face 15 of the wall 5 by means of a clamp having a plurality of legs 16 extending from the central portion thereof, which is secured by means of a screw-threaded headed member 17 to the bottom 5, said screw-threaded member being in secrew-threaded engagement with the lug 7 and extending into a screw-threaded opening in the main body portion of the bottom 5. The fingers 16 of the clamping member have upwardly extending end portions 18 that engage said heating element. The details of the internal construction of the heating element 13 are not of importance to the present invention, said heating element being of a standard character used for heating various devices.

Said heating element is provided with a pair of terminals 19 and 20 with which the conductors 21 and 22 are connected, a conductor 22 leading to a thermostatic element 23, which is secured with its bimetallic element 24 in contact with the bottom wall 5 of the water receptacle. The details of construction of the thermostatic element are not a part of my invention, and said thermostatic element is of a standard character. It is provided with means for adjusting the same in a well known manner. The conductor 25 extends from the thermostatic element, the pair of conductors 21 and 25 being mounted in a suitable insulating sheath 26 and extending outwardly through a sheet metal housing member 27 mounted on the flat face 28 of the water receptacle through an opening 29 to any suitable electrical outlet, the cord thus provided being secured to a block 31 provided on the housing 27 by means of a screw-threaded headed member 32. The housing 27 is detachably mounted on the receptacle body portion by means of screw-threaded headed members 33 entering screw-threaded openings in the body portion of the water receptacle.

The water receptacle is provided with an outwardly flaring wall portion 34 extending upwardly a predetermined distance above the outer edge portion of the bottom wall 5, said outwardly flaring wall portion 34 and the convex surface 6 of the bottom wall 5 meeting in a smooth curve 35. The upper side wall portion 35 of the water receptacle 3 inclines inwardly slightly and has an inwardly directed annular flange 36 at the top thereof, which terminates in a depending lip 37 defining a groove 46 between said lip and the side wall portion 35. The lip 37, preferably, has a flat bottom face 38 and the flange has a wide finished cylindrical inner face 39 and a flat finished top face 40, for a purpose to be described below.

The glue pot has a substantially cylindrical side wall 41 and a bottom wall 42 which is recessed at 43 to provide an annular rib 44 at the peripheral edge of said bottom wall 42. It will be noted that the bottom wall 42 is spaced from the wall 5, but that the wall 5, due to its convexity, approaches the wall 45 much more closely near the center thereof at the outer peripheral edge thereof. The relative spacing of said wall portions and the shape thereof in conjunction with the annular heating element cause the convection currents of water set up by action of the heating element to flow along the bottom and up the side wall of the glue container to thus heat all of the walls thereof substantially equally. The thermostatic element is set so as to maintain a temperature of the water below the boiling point thereof at the right temperature to keep the glue in the glue container in proper condition for use without overheating the same. There will accordingly be no steam formed, but there is an evaporation of water at all times in any body of water, and particularly if it is heated. The water evaporated will condense on the flange 36 and will drip off the sharp corner 45 between the groove or recess 46 and the flat face 38 of the lip 37.

The glue container has a slightly thickened wall portion 47 near the upper end of the side wall 41, which is provided with a finished cylindrical surface 48 that snugly fits the finished surface 39 on the inner face of the flange 36 and said side wall is provided with an outwardly directed flange 49 that has an annular flat bottom face 50 that engages closely with the flat top face 40 of the flange 36. Said flange 49 is also provided with an upwardly directed annular rib portion 51 that has a curved portion 52 providing a downwardly curved surface that extends to the flat top face or ledge 53 provided on the said flange 49 at its inner edge portion.

A lid 54 is provided for the glue container, which may be provided with a handle or knob 55 of heat insulating material, which is secured to the lid by means of a screw-threaded headed member 56. Said lid has a depending annular flange or rib 57 that fits within the wall 41 and has an outwardly directed flange portion 58 that has a flat bottom face engaging the flat top face 53 of the flange 49 on the side wall of said glue container.

It will be obvious from the above description that my improved electrically heated glue pot has means for evenly heating the contents of the glue pot by means of a water bath and means for returning any water that will condense within the receptacle to the body of water in said water receptacle in cooperation with means for preventing the escape of any water between the walls of the water receptacle and the glue container. It will further be obvious that said glue container is provided with means for mounting a lid thereon so that the lid can be easily fitted in closing position on the glue container, and that the glue container is provided with means for directing any glue that might accidentally be spilled on the flange 49 from running down the outer side of the flange and thus the outer side of the water receptacle, said flange providing means for returning the glue to the body thereof in the inner glue container.

What I claim is:

1. A device of the character described, comprising a water receptacle, means for heating the same, and a glue container within said receptacle, said water receptacle having a side wall having an inwardly directed flange terminating in a depending annular rib spaced inwardly from said side wall to provide a condensate drip flange on said water receptacle, said flange having a flat finished top face and a finished cylindrical inner peripheral face, and said glue container having a side wall having an outwardly directed flange coextensive with said finished top face, said outwardly directed flange having a flat finished bottom face closely engaging the finished top face of the flange on said water receptacle and a cylindrical finished surface on the wall of said glue container co-extensive with and closely fitting said finished cylindrical face on the flange of said water receptacle to provide a fluid tight joint between said receptacle and container at said flat and cylindrical faces.

2. A device of the character described, comprising a water receptacle, means for heating the same, and a glue container within said receptacle, said water receptacle having a bottom wall having a convex top face, means for heating said bottom wall on the under side thereof, and said glue container having a flat bottom wall spaced from the bottom wall of said water receptacle, said bottom wall of said glue container having a flat bottom face having a depending peripheral annular rib thereon, said convex top face approaching nearest said flat bottom face at the center thereof.

3. A device of the character described, comprising a water receptacle, means for heating the same, and a glue container within said receptacle, said water receptacle having a bottom wall having a convex top face and a flat bottom face to provide a wall gradually increasing in thickness toward the center thereof, and an outwardly flaring side wall extending upwardly above said bottom wall, said glue container having a bottom wall spaced from the bottom wall of said water receptacle, the bottom wall of said glue container having a flat bottom face and said convex top face approaching nearest the flat bottom face of said glue container at the center thereof, and means for heating the bottom wall of said water receptacle opposite the bottom wall of said glue container.

4. A device of the character described, comprising a water receptacle, means for heating the same, and a glue container within said receptacle, said water receptacle having a circular bottom wall having a convex top face and a flat bottom face to provide a wall gradually increasing in thickness toward the center thereof, and having a marginal flange depending therefrom, means cooperating with said flange to form a housing, and an annular heating element mounted on the under side of said bottom wall within said housing co-axially with said bottom wall.

5. A device of the character described, comprising a water receptacle, means for heating the same, and a glue container within said receptacle, said water receptacle gradually increasing in thickness toward the center thereof to provide a circular bottom wall having a convex top face on said bottom wall, and a lug integral with said bottom wall projecting from the under side of said bottom wall in alignment with the center of said convex face, an annular flat heating element concentrically arranged around said lug with said lug projecting through a central opening therein, and clamping means secured to said lug and engaging said heating element to clamp said heating element to the under face of said bottom wall.

6. A device of the character described, comprising a water receptacle, means for heating the same, a glue container within said receptacle, said water receptacle having a side wall having an inwardly directed flange terminating in a depending annular rib spaced from said side wall, said flange having a flat finished top face, and said glue container having a side wall having an outwardly directed flange, said outwardly directed flange having a flat finished bottom face closely engaging the top face of the flange on said water receptacle, said flange on said glue container having an upstanding annular marginal rib thereon and a flat face depressed below said rib, said rib inclining toward said flat face, and a lid on said glue container seated on said flat face.

7. A device of the character described, comprising a water receptacle, means for heating the same, a glue container within said receptacle, said water receptacle having a side wall having an inwardly directed flange terminating in a depending annular rib spaced from said side wall, said flange having a flat finished top face, and said glue container having a side wall having an outwardly directed flange, said outwardly directed flange having a flat finished bottom face closely engaging the top face of the flange on said water receptacle, said flange on said glue container having an upstanding annular marginal rib thereon and a flat face depressed below said rib, said rib inclining toward said flat face, and a lid on said glue container seated on said flat face, said lid having a depending rib engaging within the side wall of said glue container.

CLYDE H. HENDERSON.

REFERENCES CITED

The following references are of record in the file of this patent:

UNITED STATES PATENTS

| Number | Name | Date |
|---|---|---|
| 1,055,882 | Cubitt | Mar. 11, 1913 |
| 1,170,170 | Kuhn et al. | Feb. 1, 1916 |
| 1,344,326 | Williams | June 22, 1920 |
| 1,673,395 | Clark | June 12, 1928 |
| 1,975,464 | Juengst et al. | Oct. 2, 1934 |
| 2,164,813 | Gunther | July 4, 1939 |
| 2,235,911 | Wilcox | Mar. 25, 1941 |